(No Model.) 2 Sheets—Sheet 1.

H. McPHERSON.
SIDE DELIVERY HORSE HAY RAKE.

No. 431,171. Patented July 1, 1890.

Witnesses
Daniel P. Lemon
Edward M Bray

Inventor
Horace McPherson By
Thos. H. Hutchins atty (No Model.) 2 Sheets—Sheet 2.
H. McPHERSON.
SIDE DELIVERY HORSE HAY RAKE.
No. 431,171. Patented July 1, 1890.
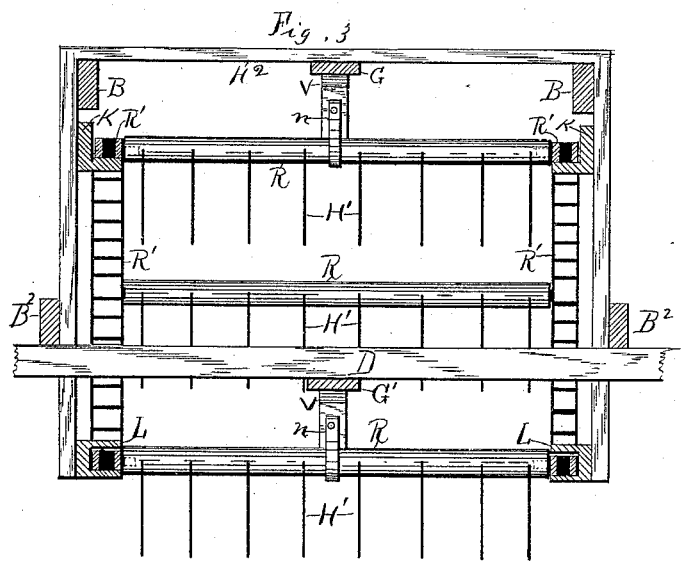
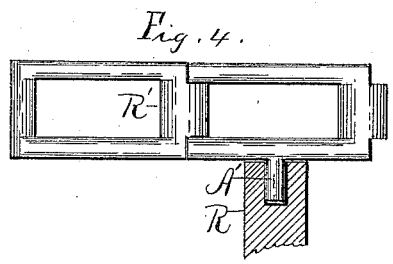
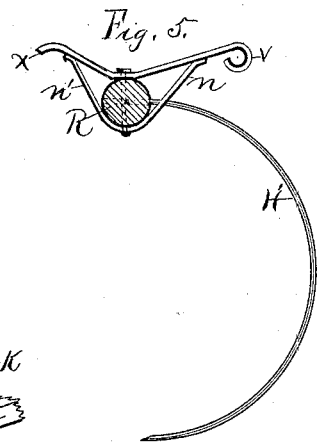
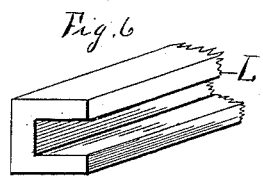
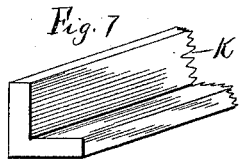
Witnesses
Daniel P. Lennon
Edward M. Bray
Inventor
Horace McPherson By
Thos. H. Hutchins atty

UNITED STATES PATENT OFFICE.

HORACE McPHERSON, OF CRETE, ILLINOIS.

SIDE-DELIVERY HORSE HAY-RAKE.

SPECIFICATION forming part of Letters Patent No. 431,171, dated July 1, 1890.

Application filed September 13, 1889. Serial No. 323,819. (No model.)

*To all whom it may concern:*

Be it known that I, HORACE MCPHERSON, a citizen of the United States of America, residing at Crete, in the county of Will and State of Illinois, have invented certain new and useful Improvements in Horse Hay-Rakes, of which the following is a specification, reference being had therein to the accompanying drawings, and the letters of reference thereon, forming a part of this specification, in which—

Figure 1:
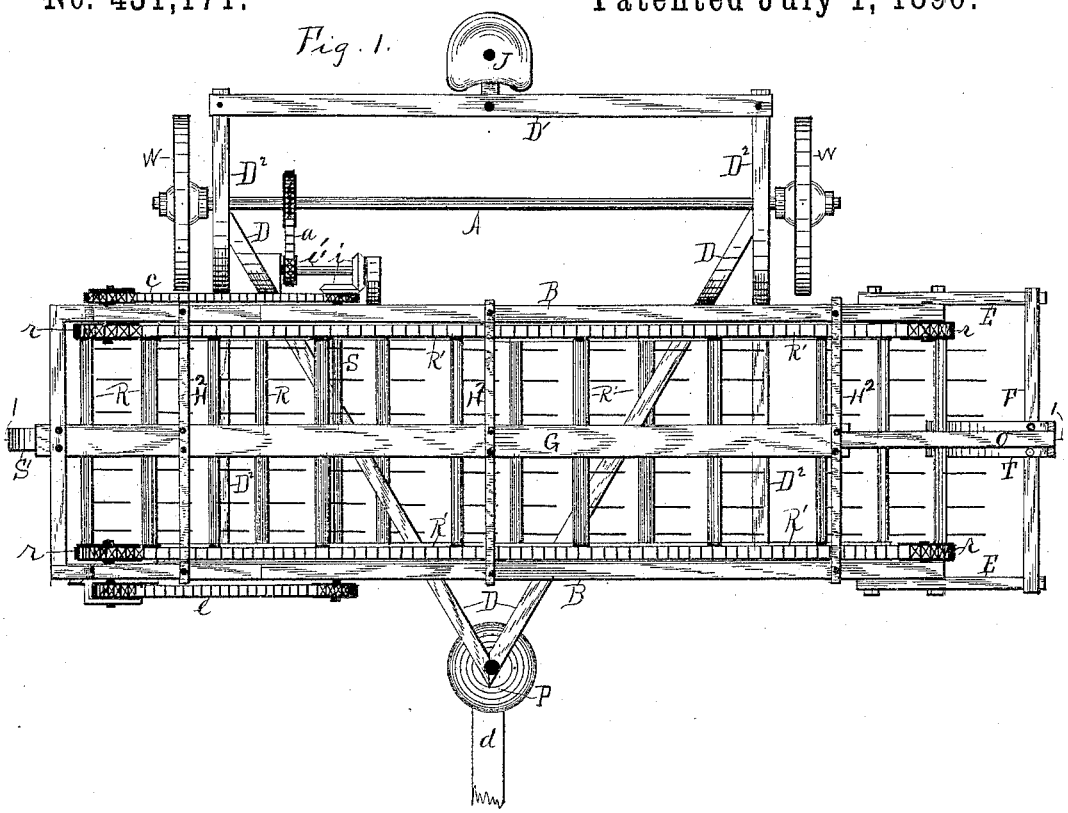
Figure 2:
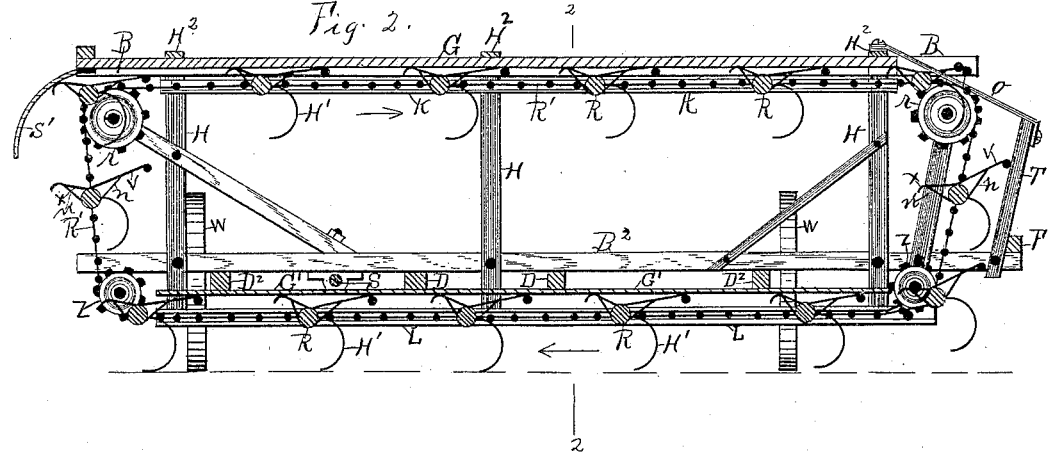

Figure 1 is a top plan view of the horse hay-rake. Fig. 2 is a vertical section of Fig. 1 on line 1, looking rearward. Fig. 3 is a cross-section of Fig. 2, looking to the left. Fig. 4 is a plan of a section of one of the sprocket-chains carrying the rakes, and a section of a portion of a rake-head, showing its means of attachment to the sprocket-chain. Fig. 5 is a cross-section of a rake-head and a side view of one of the teeth and of the guide-arms for holding the rake-teeth in place and to their work. Fig. 6 is a perspective view of a section of one of the lower guideways for guiding the sprocket-chains of the rakes, and Fig. 7 is a perspective view of a section of one of the upper guideways for guiding the sprocket-chains of the rakes.

This invention relates to certain improvements in horse hay-rakes; and it consists principally in providing the machine with a pair of endless sprocket-chains carrying a series of spring-toothed rakes and arranged to rotate across the path of the machine over suitable sprocket-wheels attached to the frame at either side, and by which the sprocket-chains are driven, to rake the hay to one side of the machine to form a windrow.

Referring to the drawings, the main frame is supported on the traveling wheels W W, and a caster-wheel P in front, to the rotatable frame of which caster the tongue $d$ attaches. The said frame consists of the beams D D' D$^2$, forming the bed-sills, and the beams B B$^2$, which are supported by the vertically-arranged posts H, that also pass across the top of the machine and form cross-bars H$^2$ to hold its sides together, and also form a support for the upper guide-rail G for holding the rake in position.

R' R' are a pair of endless sprocket-chains, which are arranged in a frame across the path of the machine and between the beams B B$^2$. These sprocket-chains pass, respectively, over the sprocket-wheels $r$ and $z$, and are supported in their horizontal parts respectively by means of the guideways K and L. These guides are secured to the posts H on their inner sides, the guide L at the lower end of said posts and the guide K near their upper ends, as shown in Figs. 2 and 3. The upper guide K is formed, preferably, of angle-iron arranged so that the sprocket-chains R' rest and travel on their horizontal part. The lower guide L is formed with a longitudinal groove in which the sprocket-chains R' rest and travel, the upper flange of said groove serving to hold the rakes down to their work. The said sprocket-chains R' are provided on their inner sides at suitable intervals with extending studs A', as shown in Fig. 4. These studs are for the purpose of supporting the rake-heads R by means of said studs being journaled in the ends of the rake-heads, as shown in said figure, and in such manner that the rake-heads may partially rotate on said studs.

The rake-heads are provided with ordinary spring-teeth H', secured thereto in any suitable manner. The rake-heads R are each provided about centrally on their upper side with the extending arms X and V, as shown particularly in Fig. 5. These arms are curved downward at their extending ends and are supported by means of braces $n$ and $n'$, secured, respectively, at their outer ends to said arms, and the said arms and braces are secured to the rake-heads by means of a bolt or rivet passing through, as shown in said figure.

G is a guard-rail secured across the top of the machine to the under side of the cross-bars H$^2$ and over the arms X and V on the rake-heads, which respectively engage said rail on its under side for the purpose of holding the rakes in proper position and preventing their swinging motion while traversing the machine. G' is another similar guard-rail secured parallel with and below guard-rail G to the under side of the bed-sills D D$^2$, immediately above arms V X of the rake-heads R', which arms respectively engage said rail. Said guard-rail G' is for the purpose of engaging said arms, and thereby hold the rake-teeth H' to their work as they move across the machine.

S' is a guard-iron secured to the end of guard-rail G, and is for the purpose of engaging the outer ends of arms X of the rake-heads in their upward passage at that end of the machine, and thus turn the rakes backward to discharge any hay that might adhere to them.

T is a guard-rail secured to the opposite end of the machine by means of cross-bar F and brace O and in such position as to be engaged by the extending ends of arms V in the downward passage of the rakes, and retaining such engagement until arm X passes under the end of guard-rail G', as shown in Fig. 2, otherwise arm X would strike against the end of rail G' and prevent operation of the machine.

The endless sprocket-chains R and their rakes R' are driven from axle A of the traveling wheels through the medium of the sprocket-chains $a$ $c$ $e$ and their sprocket-wheels, shafts S and $i'$, and bevel-gears $i$, the shafts of sprocket-wheels $r$ extending through boxes to the outer sides of the frame, and being respectively provided with sprocket-wheels bearing the sprocket-chains $c$ and $e$. Any other suitable means may be used, however, to drive said rake-chains.

J is a driver's seat.

In operation, as the machine moves forward the sprocket-chains bearing the rakes are driven across the path of the machine in the direction of the arrows, and cause the rakes to rake the hay continuously to one side of the machine to form a windrow.

Having thus described my invention, what I claim as new, and desire to secure by Letters Patent, is as follows, to wit:

1. In the horse hay-rake shown and described, the combination, with the main frame, of the two parallel endless sprocket-chains R', arranged to travel across the path of the machine, and respectively having the inwardly-projecting side studs A', the two parallel guides K and L, arranged to respectively support and guide the upper and lower part of said chains, the series of spring-toothed rakes H R, pivotally secured to and between said chains and adapted to be carried thereby, and having respectively the arms V and X, the guard-rails G and G', centrally arranged across the machine and adapted to engage the extending ends of the rake-arms to hold the rakes in proper position, the guard-rail T, for engaging rake-arms V to direct arms X under guard G', curved guard S', for engaging arms X and cause the rakes to dump their load, and the means shown for driving said chains and rakes across the path of the machine, substantially as and for the purpose set forth.

2. In the horse hay-rake shown and described, in combination with the main frame, the two driven parallel endless sprocket-chains R' R', the guides K and L for respectively supporting and guiding the upper and lower part of said chains, the series of spring-toothed rakes H R, pivotally attached to and between the said chains, and respectively having the arms V and X, and the guards G G' T and S', for respectively engaging said rake-arms and holding the rakes in proper position, substantially as and for the purpose set forth.

HORACE McPHERSON.

Witnesses:
 THOS. H. HUTCHINS,
 JAMES E. MARTIN.